C. E. INGLIS.
NUT LOCK.
APPLICATION FILED OCT. 7, 1916.
1,220,129.
Patented Mar. 20, 1917.
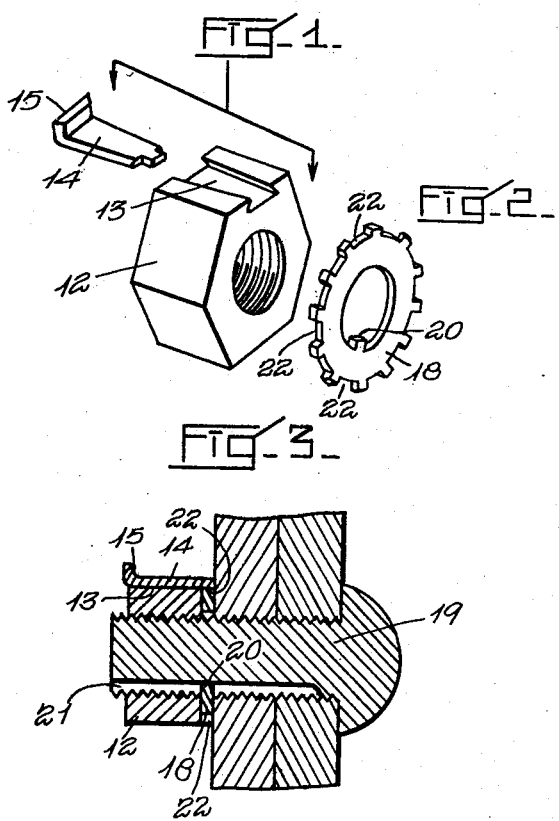
INVENTOR:
C. E. INGLIS
By
ATTORNEYS

UNITED STATES PATENT OFFICE.

CHARLES E. INGLIS, OF MALDEN, MASSACHUSETTS, ASSIGNOR OF ONE-HALF TO EDWARD CONNELL, OF MALDEN, MASSACHUSETTS.

NUT-LOCK.

1,220,129.      Specification of Letters Patent.      Patented Mar. 20, 1917.

Application filed October 7, 1916. Serial No. 124,283.

*To all whom it may concern:*

Be it known that I, CHARLES E. INGLIS, a citizen of the United States, residing at Malden, in the county of Middlesex and State of Massachusetts, have invented new and useful Improvements in Nut-Locks, of which the following is a specification.

This invention relates to a nut lock including a marginally notched washer adapted to surround a bolt and slide lengthwise thereon without rotating, and a nut engageable with the bolt and provided with means whereby it may be interlocked with the washer after the nut is turned to place, the washer being confined against rotation on the bolt and similarly confining the nut.

The invention has for its object to provide simple and effective means for engaging the nut with the washer in such manner that the nut is not liable to be accidentally disengaged but is adapted to be disengaged if this is necessary.

The invention is embodied in the improvements which I will now proceed to describe and claim.

Of the accompanying drawings forming a part of this specification—

Figure 1 represents a perspective view of a nut embodying my invention, the parts thereof being separated.

Fig. 2 represents a perspective view of the notched washer.

Fig. 3 represents a longitudinal section of a bolt with the nut and washer engaged therewith.

The same reference characters indicate the same or similar parts in all the views.

In the drawings—

12 represents a hexagonal nut, provided in one of its peripheral faces with a dovetailed tapering recess 13 extending from end to end of the nut, the narrower end of the recess being at the inner end of the nut.

14 represents a dovetailed tapering locking member or key adapted to closely fit the recess 13 and be retained in firm engagement with the nut when driven into said recess. The length of said locking member is such that when it has been driven to a bearing on the walls of the recess, its inner end will project as a tongue from the inner end of the nut. It is an easy matter to drive the locking member by a few blows of a hammer in one direction into such firm frictional engagement with the walls of the recess that the connection between said tongue and the nut is inseparable by any jolts or jars to which the nut is liable to be subjected. At the same time the locking member is separable from the nut by hammer blows exerted in the opposite direction, the locking member being provided with a shoulder 15 which is preferably the upturned outer end of the locking member, and is arranged to receive hammer blows tending to disengage the locking member from the nut.

18 represents a washer formed to surround the bolt 19 with which the nut is engaged. Said washer has in its central opening a tongue 20 adapted to enter and slide in a longitudinal slot 21 in one side of the bolt, said tongue and slot preventing the washer from turning on the bolt. The perimeter of the washer is provided with a plurality of notches 22 either of which is adapted to receive the inner end of the locking member when the latter is projected from the inner end of the bolt. When the locking member is engaged with a notch 22 the nut is prevented from turning in either direction on the bolt.

The nut is turned to place on the bolt while the locking member is withdrawn, the washer being clamped between the inner end of the nut and one of the parts connected by the bolt.

The locking member is then driven into frictional engagement with the walls of the recess 13, its inner end being at the same time caused to enter a notch 22 in the washer.

The nut is thus securely locked against rotary movement in either direction.

When it is desired to remove the nut, the locking member may be driven backward by percussive force exerted on its shoulder 15.

I claim:

1. A nut having in one of its external peripheral faces a tapering dovetailed recess, and a tapering dovetailed locking member adapted to be driven into said recess and frictionally engage the walls thereof, the narrower end of the locking member projecting from the inner end of the nut when said member is driven to place, and adapted to engage a notched washer.

2. A nut having in one of its external peripheral faces a tapering dovetailed recess, and a tapering dovetailed locking member adapted to be driven into said recess and frictionally engage the walls thereof, the narrower end of the locking member projecting from the inner end of the nut when said member is driven to place, and adapted to engage a notched washer, said locking member being provided with a shoulder adapted to facilitate its removal from the nut.

3. In combination, a nut having in one of its external peripheral faces, a tapering dovetailed recess, a tapering dovetailed locking member adapted to be driven into said recess and frictionally engage the walls thereof, the narrower end of the locking member projecting from the inner end of the nut when said member is driven to place, a bolt engageable by the nut and having a longitudinal slot, and a washer having a tongue adapted to enter said slot, and a plurality of notches in its perimeter, either of which is adapted to receive the projecting end of said locking member, the outer end portion of said member being provided with a shoulder adapted to facilitate the removal of the member from the nut.

In testimony whereof I have affixed my signature.

CHARLES E. INGLIS.

Copies of this patent may be obtained for five cents each, by addressing the "Commissioner of Patents, Washington, D. C."